United States Patent [19]

Kunkle

[11] 4,003,811

[45] Jan. 18, 1977

[54] ELECTROKINETIC SEPARATION OF SOLID PARTICLES FROM AQUEOUS SUSPENSIONS THEREOF

[75] Inventor: Albert C. Kunkle, Macon, Ga.

[73] Assignee: J. M. Huber Corporation, Borger, Tex.

[22] Filed: Dec. 13, 1974

[21] Appl. No.: 532,657

Related U.S. Application Data

[63] Continuation of Ser. No. 436,408, Jan. 25, 1974, abandoned, and a continuation-in-part of Ser. No. 403,191, Sept. 26, 1973, abandoned, and a continuation-in-part of Ser. No. 263,376, June 5, 1972, abandoned.

[52] U.S. Cl. .................. 204/180 R; 204/299 R
[51] Int. Cl.² .................... B01D 13/02
[58] Field of Search ............ 204/180 R, 299, 300

[56] References Cited
UNITED STATES PATENTS

| | | | |
|---|---|---|---|
| 1,366,456 | 1/1921 | Highfield | 204/180 R |
| 1,719,984 | 7/1929 | Klein et al. | 204/301 |
| 2,500,878 | 3/1950 | Sieling | 204/180 R |
| 2,571,247 | 10/1951 | Huebotter | 204/180 R |

*Primary Examiner*—John H. Mack
*Assistant Examiner*—A. C. Prescott
*Attorney, Agent, or Firm*—Harold H. Flanders; August E. Roehrig, Jr.

[57] ABSTRACT

A process for the electrokinetic separation of finely divided clay particles from an aqueous suspension thereof, the suspension being contained in an electrokinetic cell equipped with an anode and cathode separated by a semi-permeable membrane impermeable to clay particles. Upon activation of the cell with direct current, clay particles are caused to deposit electrophoretically on the anode. Simultaneously with the deposition of the clay deposit, portions of the water contained in the suspension and entrained in the deposit are caused to migrate electroosmotically through the membrane and collected at a cathode compartment.

9 Claims, 3 Drawing Figures

ELECTROKINETIC SEPARATION OF SOLID PARTICLES FROM AQUEOUS SUSPENSIONS THEREOF

REFERENCE TO RELATED APPLICATIONS

This application is a continuation of application Ser. No. 436,408, filed Jan. 25, 1974 now abandoned, and is a continuation-in-part of copending application Ser. No. 403,191 filed Sept. 26, 1973 now abandoned, and of its parent application Ser. No. 263,376 filed June 5, 1972 now abandoned, in the name of Albert C. Kunkle.

BACKGROUND OF THE INVENTION

This invention relates to a process for the separation of finely divided clay particles from aqueous suspensions thereof and, more particularly, to an electrokinetic process wherein the aqueous suspension is effected simultaneously by electrophoresis and electroosmosis.

Clay such as kaolin, bentonite and the like are widely used as adsorbents, pigments, catalysts, paper fillers and the like. These clays generally occur in geological deposits as mixtures with inert foreign materials, and it is necessary to separate the clay material before the clay is utilized in commercial applications.

In effecting the separation, the crude clay is dispersed in water with the aid of dispersing chemicals such as sodium silicate, sodium hexametaphosphate, sodium tripolyphosphate and tetrasodium pyrophosphate and the clay slurry is blunged, degritted, classified and leached to effect removal of the undesired foreign materials. Following these steps, the clay is filtered to remove the dispersing and leaching chemicals and to produce a solid filter cake containing 50% to 60% clay. This 50% to 60% solids cake is then redispersed and spray dried or otherwise dried in the flocculated state. For various economic reasons it is desirable in the clay industry to ship slurries containing 70% solids. Therefore, it is conventional in the clay art to add approximately 35% to 50% spray dried clay to a 50% to 60% solids redispersed filter cake to yield a 70% solids slurry. The addition of spray dried clay to clay filter cake to prepare a 70% solids slurry for shipment adds significantly to the high cost of the shipped slurry due to the relatively high costs of preparing the spray dried clay. The art, therefore, has been continually seeking to effect methods whereby clay filter cakes containing 70% clay can be directly obtained from clay suspensions without the addition of spray dried clay.

Among the methods which the art has investigated it its attempt to obtain a more concentrated, i.e., 70% solids clay cake, has been the use of electrokinetic phenomenon such as electrophoresis and electroosmosis.

Most solid materials when suspended as fine particles in a liquid acquire an electric charge. By applying a DC (Direct Current) electric field between two electrodes immersed in the particle suspension, the particles are caused to travel toward one of the electrodes and form a deposit thereon. This travelling of solid particles through a liquid due to the application of DC is referred to in the art as electrophoresis. When under the influence of a direct current potential, water or other liquid medium is caused to migrate through a stationary porous diaphragm toward a charged electrode. This phenomenon is referred to in the art as electroosmosis. Both electrophoresis and electroosmosis have been applied to the separation of clays from aqueous suspensions thereof. When applied to aqueous clay suspensions, electrophoresis is generally used to effect the deposition of the suspended clay material on a charged electrode, whereas electroosmosis functions as an aid in consolidating and concentrating the electrophoretically deposited clay by removal of the entrained water from the deposit.

General descriptions of these phenomena may be found at Kirk-Othmer, *Encyclopedia of Chemical Technology*, V. 5 (1950, pp. 549–551, 606–610, V. 7, (2d Ed. 1965) pp. 841–865, V. 8, (2d Ed. 1965) pp. 23–36, Interscience Encyclopedia, Inc., N.Y., N.Y.; Poole-Doyle, *Solid-Liquid Separation*, pp. 44–59, 100–188, 471–479, 511–513, 627–634, 698, 749, 750, 782, 835–844, 869, 873, 922, 923, Monlik, "Physical Aspects of Electrofiltration", *Environmental Science J Technology*, V. 5, No. 9, September 1971, pp. 771–776; Reif, "Electrokinetics", *Industrial Research*, December 1971; Creighton, *Electrochemistry*, V. 1, pp. 143–165, John Wiley & Sons, Inc., N.Y., N.Y. 1943; Sennett-Olivier, "Colloidal Dispersions, Electrokinetic Effects, and the Concept of Zeta Potential" *Chemistry and Physics of Interfaces*, pp. 73–92 American Chemical Society, Washington, D.C., 1965; Daniels-Alberty, *Physical Chemistry*, pp. 512–516, John Wiley & Sons, Inc., N.Y., N.Y., 1955; Glasstone, *Textbook of Physical Chemistry*, 2d Ed., pp. 1219–1240, D. Van Nostrand Co., Inc., Princeton, N.J., 1946.

Descriptions of some specific applications may be found in Curtis, C. E., "The Electrical Dewatering of Clay Suspensions", *J. Am. Ceram. Soc.*, 14, 219 (1931); Drever, J. I., "The Separation of Clay Minerals by Continuous Particle Electrophoresis", *Am. Mineralogist*, 54, 937 (1969); and Miller-Baker, "Electrophoretic-Specific Gravity Separation of Pyrite from Coal", Report 7440, Bureau of Mines, Dept. of Interior, (1970).

In addition, the following patents are representative of the prior arts attempts to employ those phenomena in practical applications: Ser. No. 936,805 (1963); U.S. Pat. Nos. 670,350; 720,186; 894,070; 972,029; 993,888; 1,121,409; 1,133,967; 1,156,715; 1,174,946; 1,233,713; 1,229,203; 1,235,063; 1,266,329; 1,326,106; 2,099,328; 2,236,861; 2,295,476; 2,440,504; 2,448,848; 2,485,335; 2,500,878; 3,396,097; 3,412,002; 3,412,008; 3,455,805; 3,497,439; 3,533,929; 3,556,969; 3,589,991; and 3,616,453.

While the effect of electrophoresis and electroosmosis on clay separation has long been known, they are not commercially successful by the present day art. Attempts by the art to replace the filtration procedures conventionally used to prepare clay filter cakes from clay suspensions with electrophoretic or electroosmotic devices have not been notably successful, particularly from an economic standpoint.

SUMMARY OF THE INVENTION

In accordance with the present invention, there is provided a method for electrokinetically obtaining clay filter cakes having a clay solids content of at least 70% wherein an aqueous clay suspension having a clay solids content considerably less than 70% is introduced into an electrokinetic cell provided with an anode and a cathode, the anode and cathode being separated by a semi-permeable membrane impermeable to the passage of clay particles, the anode forming an anodic compartment with the membrane and the cathode forming a cathode compartment with the membrane. The aqueous suspension containing the clay to be separated therefrom is passed into the anodic compartment and a direct current field is applied between the anode and cathode of the electrokinetic cell causing the clay solids to be electrophoretically deposited on the anode while simultaneously causing the water of the slurry, and the water entrained in the clay deposit, to migrate electroosmotically through the semi-permeable membrane and into the cathode compartment.

As will hereinafter be more fully demonstrated by the practice of the process of the present invention, a high solids clay cake deposit having a solids content in excess of 70% will be obtained at the anode, and the slurry solids in the effluent removed from the cell will remain constant thereby eliminating the need for additional treatment of the effluent. By the practice of the present invention, it is possible to effect the electrophoretic deposition of clay at the anode of an electrokinetic cell simultaneous with the electroosmotic dewatering of both the deposited clay cake, and the effluent slurry remaining after electrokinetic activation of the clay suspension fed to the cell.

BRIEF DESCRIPTION OF THE DRAWINGS

Objects of the invention, together with additional features contributing thereto and advantages accruing therefrom, will be apparent from the following description of two embodiments of the invention when read in conjunction with the accompanying drawings, wherein.

PREFERRED EMBODIMENTS

Apparatus suitable for carrying out the electrokinetic process of the present invention is shown in copending application Ser. No. 436,414, filed concurrently herewith now abandoned and entitled, "Electrokinetic Cell."

Figure 1:
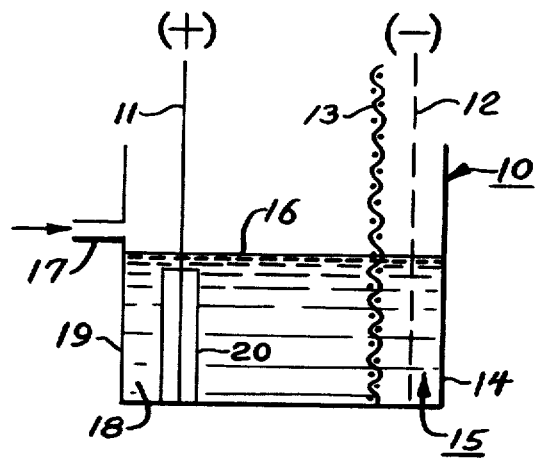
FIG. 1 is a schematic cross-section representation of one embodiment of an apparatus for use in the practice of the process of the present invention.

Briefly as described herein and as shown schematically in FIG. 1, the electrokinetic cell 10 consists of a solid anode 11 and a foraminous cathode 12 separated by semi-permeable membrane 13. The anode and cathode are connected to a source of DC not shown. The semi-permeable membrane 13 and the cell wall 14 form cathode compartment 15 containing the cathode 12 therein.

In operation, the clay suspension 16, to be electrokinetically separated, is introduced into the cell 10 by a suitable liquid inlet means 17 to the anode compartment 18 formed between the cell wall 19 and the membrane 13. Upon activation of the cell with DC, a high solids cake 20 of clay is electrophoretically deposited from the clay suspension 16 onto the anode 11 while a portion of water is simultaneously electroosmotically removed from the suspension 16 and the clay deposit 20, and migrates through the membrane 13 and is collected in the cathode compartment 15.

Figure 2:
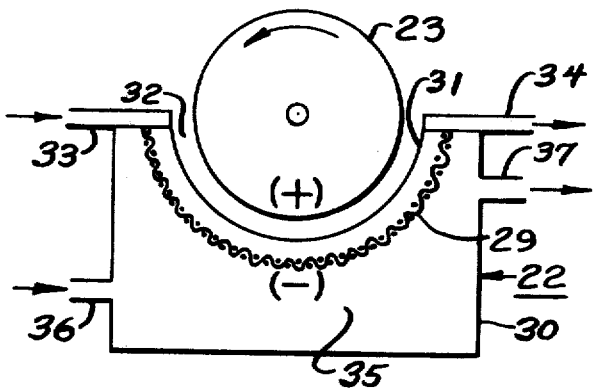
FIG. 2 is a schematic cross-sectional representation of a second and preferred embodiment of an apparatus which may be used to practice the process of the present invention.
Figure 3:
FIG. 3 is a schematic cross-sectional detailed representation of the cathode structure preferred in the present invention.

In FIGS. 2 and 3 the electrokinetic cell 22, as shown, consists of a rotatably mounted, electrically conductive drum anode 23, the rotation thereof being effected by a source of power, not shown. Spaced apart, but concentric with the drum 23, is stationary, foraminous, arcuate cathode 29 which is mounted on and insulated from the upstanding walls of tank 30. The anode 23 and cathode 29 are connected to a source of DC which is not shown. Spaced apart and separating the anode 23 and the cathode 29 is an arcuate semi-permeable diaphragm or membrane 31, also mounted on and insulated from the tank walls and concentric with the anode 23 and cathode 29. The membrane 31 is flexible, tightly woven porous fabric which is adapted to permit diffusion of water but is impermeable to the passage of clay solids.

The space between the diaphragm 31 and the rotating drum 23 forms and defines an anodic compartment 32 to which liquid inlet means 33 (any suitable conduit or tube of dielectric, non-corrodable material, for example, rubber or glass) extends from a suitable supply source (not shown) to the anodic chamber 32. Liquid outlet means 34 are also provided to discharge electrokinetically treated clay suspension from the anodic chamber 32 and comprises a conduit or tube of a material similar to that of the anodic chamber inlet (33) material.

The diaphragm 31 and the tank 30 define a cathodic compartment 35 containing the foraminous cathode 29 spaced inwardly from the diaphragm 31. The cathodic compartment 35 serves as a collection chamber for water electroosmotically separated from the clay slurry fed to the anodic compartment as well as entrained water electroosmotically removed from clay solids electrophoretically deposited on the drum. Electrolyte inlet means 36 and electrolyte outlet means 37 are provided in the tank 30 to allow water or other electrolyte to be conducted to and from the cathodic compartment 35.

In operation, the clay suspension to be electrokinetically separated is introduced by inlet means 33 into the anodic compartment causing portions of the drum 23 to become submerged in the clay suspension. Electrolyte solution is next admitted by electrolyte inlet means 36 into the cathodic chamber 35 in amounts sufficient to submerge the cathode 29 and contact the lower surface of the diaphragm 31. Upon activation of the rotating drum 23, the desired DC voltage is applied to the anode 23 and cathode 29. Clay suspension is then circulated through the anodic compartment 32. During the passage of the clay suspension in the anodic compartment 32 beneath the rotating drum, and while it is confined to the space between the anode 23 and the membrane 31, finely divided clay solids in the suspension are caused to be electrophoretically deposited on and adhere to the surface of the drum anode 23. The direction of rotation of the drum 23 (indicated by the arrows in FIG. 2) advances the clay solids which have deposited on the drum surface during its passage through the anodic compartment 32 upwardly and over to the opposite side of the drum where the deposit is thereupon removed from the drum surface by any removal means such as a scraper or string which contacts the drum at discharge point 28. Upon contact with the scraper or other removal means, the removed solids are discharged into a suitable clay cake collection means, not shown.

The rotation of the drum as well as the flow of clay suspension admitted to the anodic compartment is continuous so a clean drum surface is continuously presented to the clay suspension introduced into the electrokinetic cell.

Simultaneous with the electrophoretic deposition of the clay solids on the drum, the water entrained in the clay cake immediately deposited on the drum as well as a portion of the water in the anodic chamber 32 is caused to migrate electroosmotically through the diaphragm 31 towards the cathode 29. Upon reaching the cathode 29, the water electroosmotically removed from the anodic chamber 32 percolates through the foraminous surface of the cathode and into the cathode compartment 35 from which it is then removed from the cell. As the entry of water into the electrolyte in the cathodic compartment may cause undesired dilution of an electrolyte solution, fresh electrolyte solution must be continuously circulated through the cathodic compartment 35 to maintain the electrolyte concentration at the desired level.

As will hereinafter be demonstrated, due to simultaneous effect of electrophoresis and electroosmosis, clay filter cakes are obtained having solids contents in excess of 70% and the solids contents of the effluent suspension discharged from the electrophoretic cell are substantially equal to the solids content of the clay suspension charged to the electrokinetic cell.

The electrolyte which is circulated through the cathode compartment of the electrokinetic cell is generally comprised of water having some mineral content or a dilute or weak acid such as sulfuric acid, hydrochloric acid or phosphoric acid. The acid solution generally ranging in strength from 0.1% to 1% is metered into the cathode compartment at a rate sufficient to maintain the pH of the electrolyte in the cathode compartment between 2.0 and 7.0.

It has been determined that the rate of deposition per unit power (i.e., pounds per kilowatt-hour) increases when a weak solution of an electrolyte (i.e., sulfuric acid) is circulated in lieu of water in the cathodic compartment of the electrokinetic cell.

In practicing the process of the present invention, the materials used in the fabrication of electrodes of the electrokinetic cell may be any of the well known corrosion resistant, conductive materials, metals and alloys, but for ease of maintenance the electrodes should be as resistant to chemical reaction with the clay suspension as is possible. Typical anode materials include antimony-lead alloy, platinum and conductive oxide coatings on tantalum or titanium and the like. Cathode materials include the cathodic metals such as stainless steel and aluminum.

The semi-permeable membrane may be of any suitably permeable material such as Dacron, nylon, polyesters, polypropylene having a porosity of 0.5 to 4.0 cubic feet per minute.

As shown in greater detail in FIG. 3, a membrane preferred for use in the practice of the present invention is composed of Dacron and is insulated from the cathode 29 by an electrical insulator 40 such as a neoprene rubber spacer.

To achieve efficient operation of the electrokinetic cell, it is advantageous that the spacing between the anode and the membrane be in the order of about 1 inch to about 1½ inches and preferably about 1¼ inches. The spacing between the cathode and the membrane is significantly less and is desirably in the order of 1/16 inch to ¼ inch and preferably about 3/16 inch.

In practicing the process of the present invention, electrokinetic separation of clay suspensions is advantageously achieved at a current density of from about 0.05 to 0.35 amperes per square inch of effective electrode area. At these current densities, the applied voltage will typically range from 25 to 100 volts.

The process of the present invention is illustrated by the examples which follow:

EXAMPLE I

To an electrokinetic cell of the type illustrated in FIG. 1 was introduced into the anode chamber 18 a central Georgia coating grade clay having a particle size of 92% finer than 2 microns, dispersed to minimum viscosity at 60% solids with tetrasodium pyrophosphate and having a pH of 6.5. A 0.1% sulfuric acid was employed in the cathodic compartment 15. The effective electrode area was 32 square inches. The spacing between the anode 11 and membrane 13 was 1¼ inches and the spacing between the cathode 12 and membrane 13 was ¼ inches. The material from which the membrane 13 was formed was Dacron and had an average porosity of 1.5 cubic feet per minute. The anode 11 was constructed of lead, and the cathode 12 was a 100 mesh screen of 316 stainless steel.

A series of runs were made delivering varying current densities and voltages to the cell. The clay deposition period in each run was 5 minutes. The deposition rate of the clay filter cake and the change in the weight per unit power with varying current density (amps/sq. in.) are recorded in Table I below.

TABLE I

| Current Density (amps/in²) | Voltage (volts) | Wet Cake Wt. (gms) | Cake Solids (%) | Clay Removed (%) | Gms Kw-min | Total Clay Used (gms) |
| --- | --- | --- | --- | --- | --- | --- |
| 0.08 | 34 | 271 | 79 | 17 | 530 | 1260 |
| 0.11 | 42 | 351 | 79 | 20 | 360 | 1390 |
| 0.15 | 50 | 435 | 79 | 27 | 280 | 1270 |
| 0.19 | 57 | 520 | 79 | 31 | 244 | 1320 |
| 0.21 | 66 | 620 | 79 | 37 | 228 | 1320 |
| 0.25 | 75 | 697 | 78 | 40 | 186 | 1360 |
| 0.31 | 80 | 849 | 78 | 49 | 174 | 1350 |
| 0.37 | 95 | 963 | 78 | 55 | 121 | 1360 |

The data in Table I indicate that the amount of clay deposited increases with increasing current density, but the clay deposited per unit power decreases. The solids of the electrophoretically deposited cake did not change with current density and were on the order of 78–79%.

EXAMPLE II

The procedure of Example I was repeated with the exception that the current density was maintained at 0.15 amperes per square inch and the time of clay deposition was varied from 2 to 10 minutes. The effect of time on the rate of deposition (grams per minute) and on cake solids is recorded in Table II below.

For purposes of contrast, control runs were made repeating the procedure of Example II with the exception that a semi-permeable membrane was not employed in the electrokinetic cell. The results of these control runs are also recorded in Table II.

A clay cake did not form on the anode when solids in the suspension fed to the electrokinetic cell were less than 20%. The data in Table III indicate that the clay deposition rate, cake solids, and dewatering efficiency decrease with decreasing feed solids.

It is readily apparent from the data in Table III that superior results in clay deposition, effluent solids, and effluent pH are obtained in accordance with the present invention when these results are compared with

TABLE II

| Time (min.) | Total Wet Cake Wt. (grs.) | Gms Cake Min. | Cake Solids (%) | Effluent Solids (%) | Effluent pH | Clay Removed (%) | Control Effluent Solids (%) | Effluent pH |
|---|---|---|---|---|---|---|---|---|
| 2 | 200 | 100 | 76 | 60 | 6.5 | 17 | 57 | 7.5 |
| 4 | 375 | 94 | 78 | 58 | 6.5 | 37 | 54 | 8.4 |
| 7 | 650 | 93 | 79 | 57 | 6.5 | 51 | 48 | 9.2 |
| 10 | 850 | 85 | 80 | 55 | 6.5 | 69 | 41 | 11.3 |

The data in Table II indicates that the rate of clay deposition decreases with increasing time. Cake solids increase with increasing time of electrokinetic cell operation.

The data in Table II shows that by following the practice of the present invention there is obtained a filter cake having a solids content in the order of 76%–80%, an effluent having a constant pH and a solids content in the range of 55%–60%. By way of contrast in the control runs using an electrophoretic process where simultaneous electroosmosis is absent, the effluent solids range from 41%–57% and the effluent pH varies widely from 7.5 to 11.3 pH.

EXAMPLE III

The procedure of Example I was repeated with the exception that the concentration of clay in the slurry introduced into the electrokinetic cell was varied from 20%–60%. Collection time and voltage were maintained constant at 10 minutes and 50 volts. The results of these tests are recorded in Table III below.

For purposes of contrast, control runs were made using the procedure of Example III with the exception that the semi-permeable membrane was not used in the electrokinetic cell. The results of these control tests are also recorded in Table III below.

the control where a semi-permeable membrane was not used in the electrokinetic process.

EXAMPLE IV

To an electrokinetic cell of the type illustrated in FIG. 2 was introduced in the anode compartment 32 between the rotating anode 23 and the membrane 31 a Central Georgia coating grade clay having a particle size of 82% finer than 2 microns, having a 60%–61% solids concentration and a pH of 6.7. The spacing between the anode 23 and the semi-permeable membrane 31 was 1¼ inches and the spacing between the cathode 29 and the membrane 31 was 3/16 inches. The semi-permeable membrane 31 was a Dacron web having a porosity of 1.5 cubic feet per minute. The dimensions of the anode 23 were 1 × 1.5 feet and the drum was rotated at 0.16 rpm. The results of these runs are recorded in Table IV below.

TABLE IV

| Current Density (A/in) | Slurry Effluent Solids (%) | pH | Cake Solids (%) | Rate* lbs/hr. | lbs. kw-hr. |
|---|---|---|---|---|---|
| .13 | 59.6 | 6.7 | 79.2 | 50 | 42 |
| .17 | 58.0 | 6.7 | 79.0 | 65 | 33 |
| .19 | 58.0 | 6.7 | 79.0 | 76 | 34 |
| .21 | 58.0 | 6.7 | 79.0 | 85 | 30 |

*Dry Clay

EXAMPLE V

The procedure of Example IV was repeated with the exception that the clay slurry feed had a solids content of 60% and a pH of 6.5.

For the purposes of contrast, control runs were made using the procedure of Example V with the exception that the semi-permeable membrane 31 was not em-

TABLE III

| Feed Solids (%) | Total Wet Cake Wt. Gms. | Cake Solids (%) | Effluent Solids (%) | Effluent pH | Gms. Kw-min. | Control Effluent Solids (%) | Effluent pH | Gms. Kw-min. |
|---|---|---|---|---|---|---|---|---|
| 60 | 1200 | 78 | 55 | 6.7 | 210 | 38.1 | 10.9 | 194 |
| 50 | 830 | 78 | 45 | 6.7 | 167 | 26.9 | 11.1 | 156 |
| 40 | 600 | 77 | 35 | 6.8 | 150 | 15.1 | 11.3 | 127 |
| 30 | 590 | 66 | 23 | 6.8 | 143 | 6.57 | 11.4 | 96 |
| 20 | — | — | — | — | — | — | — | — | ployed in the electrokinetic cell. The results of these control tests are also recorded in Table V below.

TABLE V

|  | Cake Solids | Effluent Solids | Effluent pH | % Clay Removed | lbs. kw-hr. |
|---|---|---|---|---|---|
| Present Invention | 79% | 60% | 6.7 | 65% | 28.2 |
| Control | 79% | 44% | 10.5 | 65% | 19.4 |

Table V shows that significant differences obtained with the present invention are higher effluent solids and lower power consumption per ton of clay. Thus the present invention eliminates the need for effluent recovery and the rapid and extensive increase in effluent pH, while still providing a high solids cake.

While the invention has been described with reference to embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intent that this invention not be limited to the particular embodiment disclosed as the best mode contemplated for carrying out this invention, but that the invention will include all embodiments falling within the scope of the appended claims.

What is claimed is:

1. A method of electrokinetically separating finely divided clay particles suspended in an aqueous medium which comprises introducing a suspension of the solid particles into an electrokinetic cell provided with an anode and a cathode, and a semi-permeable membrane impermeable to clay particles separating the anode and cathode, the anode and membrane forming an anodic compartment in the cell, the cathode and membrane forming a cathodic compartment in the cell;

directing the particle suspension into the anode compartment;

circulating an electrolyte solution having a pH range from about 2 to about 7 through the cathode compartment;

applying a direct current field between the anode and cathode to cause the solid particles to be deposited from the suspension by electrophoretic action onto the anode concomitantly with the aqueous portion of the suspension being caused to migrate electroosmotically through the semi-permeable membrane and into the cathode compartment; and removing the solid particles from the anode and the water from the cathode compartment.

2. The method of claim 1 wherein the electrolyte is 0.1% $H_2SO_4$.

3. The method of claim 1 wherein a current density of about 0.05 to about 0.35 amperes per square inch of effective electrode area is delivered to the cell.

4. The method of claim 1 wherein the spacing between the anode and membrane is about 1 inch to about 1½ inches.

5. The method of claim 1 wherein the spacing between the cathode and membrane is about 1/16 inch to about ½ inch.

6. The method of claim 1 wherein the membrane is a porous fabric having a porosity of 0.5 to 4.0 cubic feet per minute.

7. The method of claim 1 wherein the aqueous suspension contains greater than 20% clay solids.

8. The method of claim 7 wherein the suspension contains 40%–60% clay solids.

9. The method of claim 1 wherein the electrolyte solution is an acid solution ranging from about 0.1% to 1%.

* * * * *

UNITED STATES PATENT OFFICE
CERTIFICATE OF CORRECTION

Patent No. 4,003,811   Dated January 18, 1977

Inventor(s) Albert C. Kunkle

It is certified that error appears in the above-identified patent and that said Letters Patent are hereby corrected as shown below:

In Column 2, line 17, the "J" should be "&"; and

In Column 2, line 41, the word "Ser." should be "Br.".

Signed and Sealed this

Twenty-sixth Day of April 1977

[SEAL]

Attest:

RUTH C. MASON
*Attesting Officer*

C. MARSHALL DANN
*Commissioner of Patents and Trademarks*